United States Patent [19]

McMurtry

[11] Patent Number: 4,689,485
[45] Date of Patent: Aug. 25, 1987

[54] OPTOELECTRONIC DISPLACEMENT MEASURING APPARATUS USING COLOR-ENCODED LIGHT

[75] Inventor: David R. McMurtry, Wotton-Under-Edge, United Kingdom

[73] Assignee: Renishaw plc, Wotton-Under-Edge, United Kingdom

[21] Appl. No.: 618,000
[22] PCT Filed: Sep. 26, 1983
[86] PCT No.: PCT/GB83/00237
    § 371 Date: May 25, 1984
    § 102(e) Date: May 25, 1984
[87] PCT Pub. No.: WO84/01214
    PCT Pub. Date: Mar. 29, 1984

[30] Foreign Application Priority Data

Sep. 25, 1982 [GB] United Kingdom ............... 8227414

[51] Int. Cl.⁴ .................................................. G01D 5/34
[52] U.S. Cl. ............................. 250/231 SE; 250/226; 250/227; 250/237 G
[58] Field of Search ............ 250/227, 231 SE, 237 G, 250/226; 340/347 P; 356/395

[56] References Cited

U.S. PATENT DOCUMENTS

| | | | |
|---|---|---|---|
| 4,096,383 | 6/1978 | Mancini et al. | 250/231 SE |
| 4,162,399 | 7/1979 | Hudson | 250/231 SE |
| 4,204,115 | 5/1980 | Boldridge, Jr. | 250/227 |
| 4,242,574 | 12/1980 | Grant | 235/92 DN |
| 4,356,396 | 10/1982 | Ruell | 250/226 |
| 4,546,246 | 10/1985 | Bechtel | 250/226 |

FOREIGN PATENT DOCUMENTS 2054995 2/1981 United Kingdom .
2057119 3/1981 United Kingdom .

Primary Examiner—David C. Nelms
Assistant Examiner—James G. Gatto
Attorney, Agent, or Firm—Spencer & Frank

[57] ABSTRACT

An apparatus for measuring displacement between two members subject to movement relative to one another. The apparatus includes a scale defined by spaced marks provided on one of the members. A light source is arranged to illuminate the marks, wherein light reflected from the marks constitutes light signals. A light-receiving device is provided on the other of the members for receiving at least two light signals reflected from the marks in predetermined phase relationship. A determining circuit is coupled for receiving the light signals and for determining the sense of direction of the relative movement of one of the members based upon the phase relationship of the two light signals. A single optical fiber is provided for transmitting the light signals between the light-receiving device and the determining circuit. Additionally, color-encoding means are located for color-encoding the respective light signals. The light-receiving device is arranged for combining the light signals into a combined light signal which is transmitted via the single optical fiber to the determining circuit. Color-decoding means are arranged between the single optical fiber and the determining circuit for color-decoding the combined light signal.

8 Claims, 6 Drawing Figures

FORWARD        REVERSE

OPTOELECTRONIC DISPLACEMENT MEASURING APPARATUS USING COLOR-ENCODED LIGHT

This invention relates to displacement measuring apparatus and has uses in the measuring of displacement of a carriage relative to a supporting track in machine tools.

BACKGROUND OF THE INVENTION

It is known in displacement measuring apparatus, e.g. for machine tools, to provide a mark-space grid on one of two relatively movable members and a reading head on the other of said members. The reading head is connected to a control unit situated on the one member, the latter usually being stationary, by a flexible cable for two-way transmission of electrical signals. Further, the reading head includes an optoelectronic system for converting an electrical signal received from the control unit into an optical signal for illumination of the grid, and for converting optical signals generated by the marks and spaces of the grid into electrical signals for transmission to the control unit, there to be converted into actual dimensions of measurement. Also, the head usually embodies means for determining the sense of direction of the movement. It has been found that the reading head can be relatively bulky or sensitive to vibration, or that the apparatus can be needful of relatively expensive connector and cable means for transmission of the electrical signal between the head and the control unit. It is generally an object of this invention to overcome or reduce those difficulties.

SUMMARY OF THE INVENTION

According to this invention there is provided apparatus for measuring displacement between a fixed and a movable member, comprising an elongate mark-space grid secured to the fixed member, a reading head secured to the movable member and adapted to traverse the grid along the length thereof during movement of the movable member, the reading head having two input stations, each adapted to receive radiation emanating from said grid in the form of a wave signal corresponding to said marks and spaces thereof, the two stations being spaced apart in the direction of the length of the grid by a distance $p(n+a)$ where p is the pitch of the marks, n is a whole number, and a is a value of approximately $\frac{1}{4}$ p so that during movement of the reading head the two wave signals are out of phase by approximately 90°, means for counting the periods or fractions thereof of at least one of the wave signals thereby to determine the relative displacement of the reading head and the grid during said movement, and means for detecting which of the two wave signals is leading the other thereby to determine the sense of direction of said displacement, characterised in that the detecting means is situated on fixed structure in a position remote from the said reading head and is connected thereto by an elongate flexible radiation guide adapted to transmit said wave signals from said reading head to said detecting means.

Preferably said radiation guide is a single such guide, said radiation insofar as it is derived from said stations has different frequencies, said reading head has means for combining said frequencies for transmission by said single guide, and said detecting means include means for discriminating between said two frequencies.

DESCRIPTION OF PREFERRED EMBODIMENTS

Figure 1:
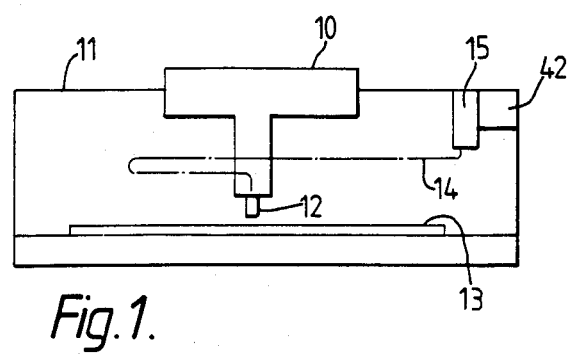
FIG. 1 is a diagrammatic side elevation of parts of a machine tool embodying the apparatus.
Figure 3:
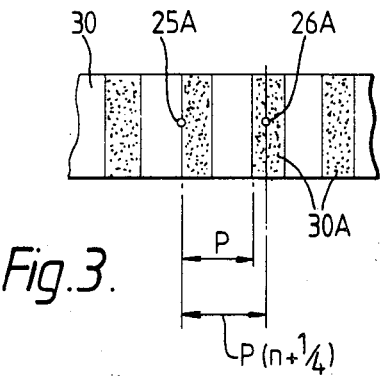
FIG. 3 is a section on the line III—III in FIG. 2.

The machine (FIG. 1) comprises a carriage 10 movable along a track 11 and supporting a reading head 12 movable together with the carriage relative to an elongate grid 13 secured to the track. The reading head 12 is connected by a single light guide 14 to a control unit or input/output unit 15 mounted on the track or other fixed structure of the machine.

Figure 2:
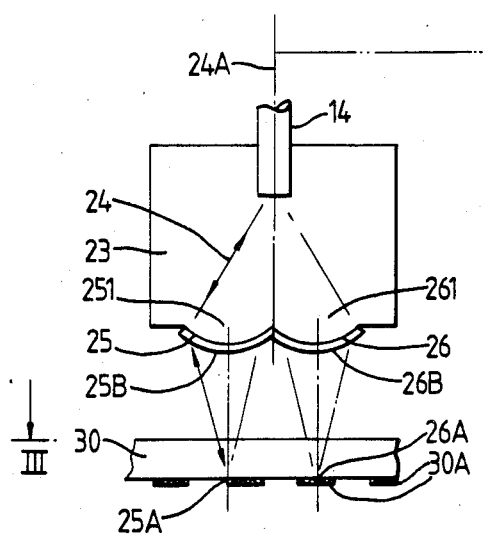
FIG. 2 is an enlarged detail of FIG. 1 showing an optical part of the apparatus.
Figure 2:
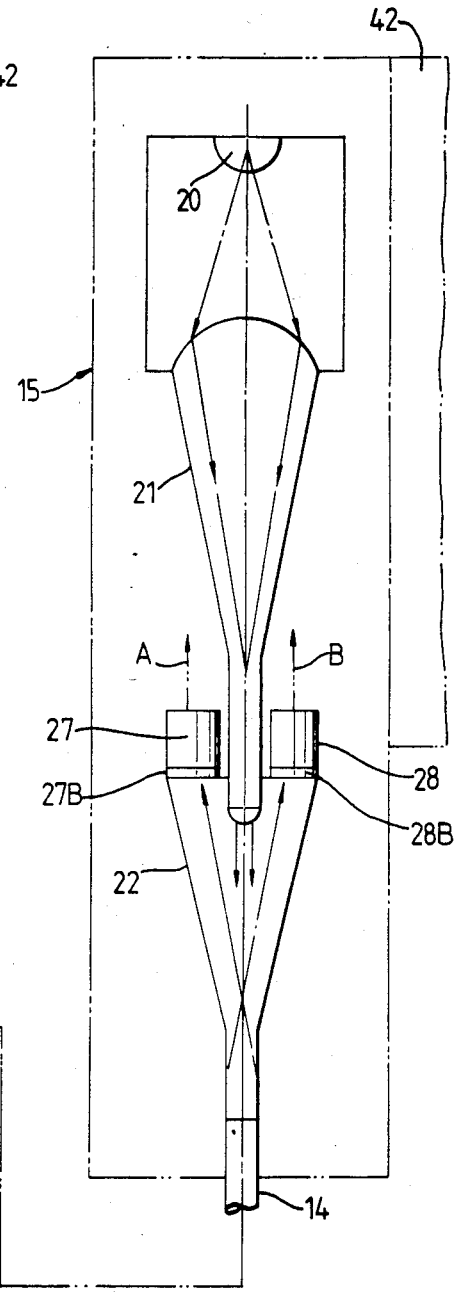

The unit 15 (FIG. 2) has a random light source 20 illuminating the wide end of a first convergent transparent member 21 whose narrow end is connected to the centre of the wide end of a second convergent transparent member 22 whose narrow end is contiguous with the guide 14. Thus scattered light entering the member 21 is transmitted through the member 22 to the guide 14. In the reading head 12 the guide 14 is connected to one end of a transparent member 23 such that a divergent cone 24 of light from the guide 14 enters the member 23 on an axis 24A. At its other end, the member 23 is formed to define two lenses, 25,26 positioned to transmit light from the cone 24 as two convergent beams focused at 25A,26A on to the grid 13.

The grid 13 comprises a glass plate 30 at the underside of which are defined grid lines 30A extending transverseley to the length of the grid. The head 12 is situated above the plate 30 and the foci 25A,26A lie at the underside of the plate 30, i.e. in the plane of the lines 30A. If either of the foci 25A,26A meets a said line 30A, the light is reflected from the line back into the guide 22 where it will emerge at the wide end of that guide to illuminate two spaced apart photodiodes 27,28. The lenses 25,26 are coated with filters 25B,26B of different colours and the photodiodes 27,28 are provided with filters 27B,28B of corresponding colours so that the photodiode 27 receives only light reflected through the lens 25, and the photodiode 28 receives only light reflected through the lens 26.

The lenses 25,26 are positioned for the foci 25A,26A to be spaced apart in the direction of the length of the grid by a distance $p(n+\frac{1}{4})$ where p=the pitch of the lines 30A and n=1 or an even multiple thereof. In other words, the foci are out of phase in relation to the grid by a quarter of a pitch, or 90°, so that when the one focus is at the edge of one grid line and illumination of one of the diodes 27,28 commences, the other focus is at the middle of another grid line and illumination of the other diode is at a maximum.

Figure 4:
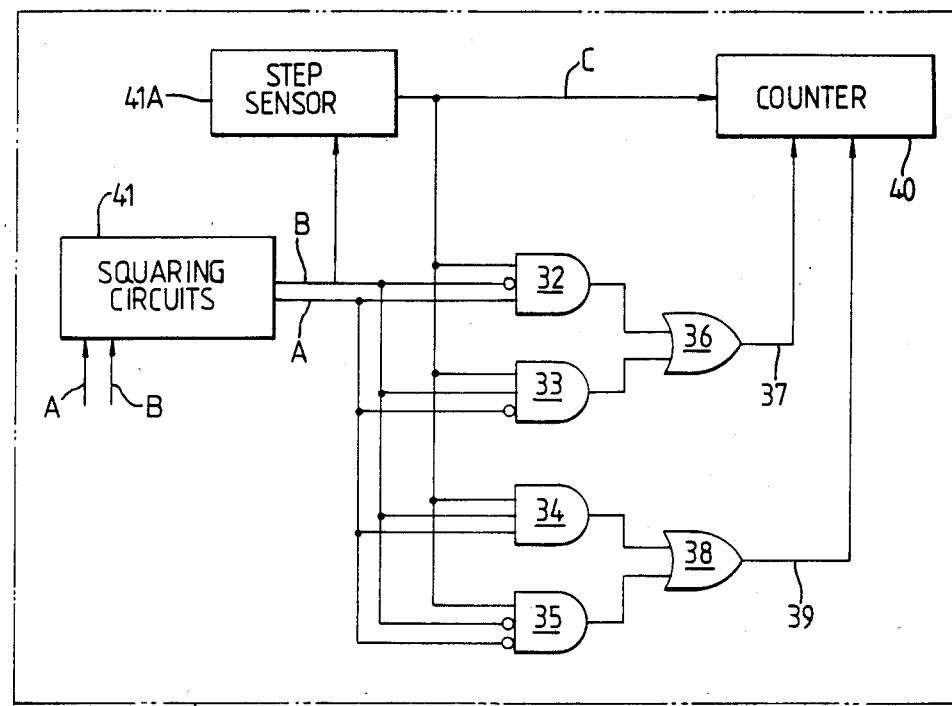
FIG. 4 is a block circuit diagram of an electronic part of the apparatus.
Figure 5:
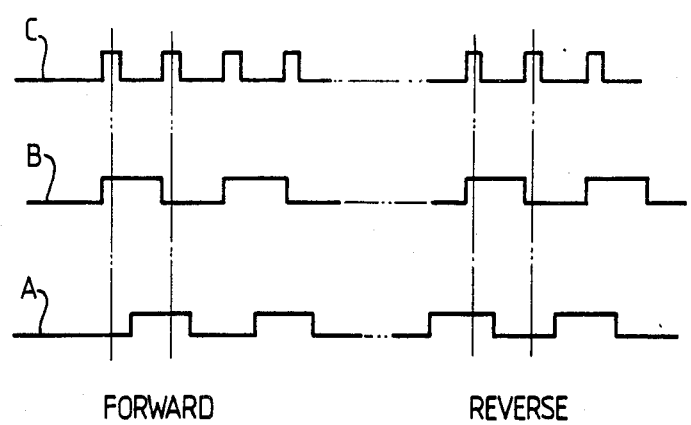
FIG. 5 is a signal diagram.

The outputs, denoted A,B, of the diodes 27,28 (FIG. 4) are substantially sinusoidal and are led through squaring circuits 41 to square the signals A,B (see also FIG. 5) one of which, B, is fed to a step-sensing circuit 41A having an output C which goes high in response to the signal B having a rising or falling step and remains high for a period slightly less than a quarter of the period of the signal B. The signals A,B,C are each led to each of four AND gates 32,33,34,35.

It will be noted (FIG. 5) that when the signals A,B are generated by travel of the carriage in one direction, say forwards, the signals A,B are at different levels for the duration of the signal C while, when the carriage travels in the opposite, i.e. reverse direction, the signals A,B are at the same level. Accordingly, the first two AND gates 32,33 are arranged to have outputs which go high when the signal C is high and one of the signals A,B is high while the other is low, and the second two gates, 34,35 are arranged to have outputs which go high when the signal C is high and both signals A,B are either high or low. The outputs of the gates 32,33 are joined at an OR gate 36 to provide a single "forward" signal 37 while the outputs of the gates 34,35 are joined to an OR gate 38 to provide a single "reverse" signal 39.

The periods of the signal C are counted by a counter 40 whose output is therefore a measure of the displacement of the carriage 10 along the track 11 in terms of a multiple of the half-periods of the signal B.

The counter 40 is reversible for the direction of count to be either "up" or "down". The signals 37,39 are connected to the counter 40 to initiate the "up" count when the signal 37 is high and to initiate the "down" count when the signal 39 is high. Reversible counters whose direction can be controlled by separate signals are known per se and are therefore not particularly described.

It is an advantage of the invention that the unit 15 can be mounted on fixed structure of the machine in a position sufficiently remote from the track 11 to be free from adverse environmental influences, i.e. dirt, temperature or vibration. Another advantage is that the connection to the unit 15 comprises only the light guides, in the example only a single such guide, compared to a system where the direction detecting means, including a light source, is mounted directly adjacent the reading head and a flexible multicore electrical cable is necessary for taking the current supply to the light source and for taking the forward and reverse signals back to the fixed structure.

The lenses 25,26 constitute input stations 251,261 for the radiation emanating from the grid 13. The light from the source 20 is a mixture of frequencies, e.g. is ordinary white light from a conventional bulb. Incident radiation from the source 20 is divided by the filters 25A,26A into respective frequencies. Reflected radiation from the grid 13 has these different frequencies and the lenses 25,26 act to combine the two frequencies by directing the reflected radiation back into the guide 14. The diodes 27,28, counter 40, squaring circuits 41, and gates 32 to 36 and 38 are a means 42 for detecting which of the waves A,B is leading the other. The filters 27B,28B are means included in the detecting means 42 for discriminating between said two frequencies.

Figure 6:
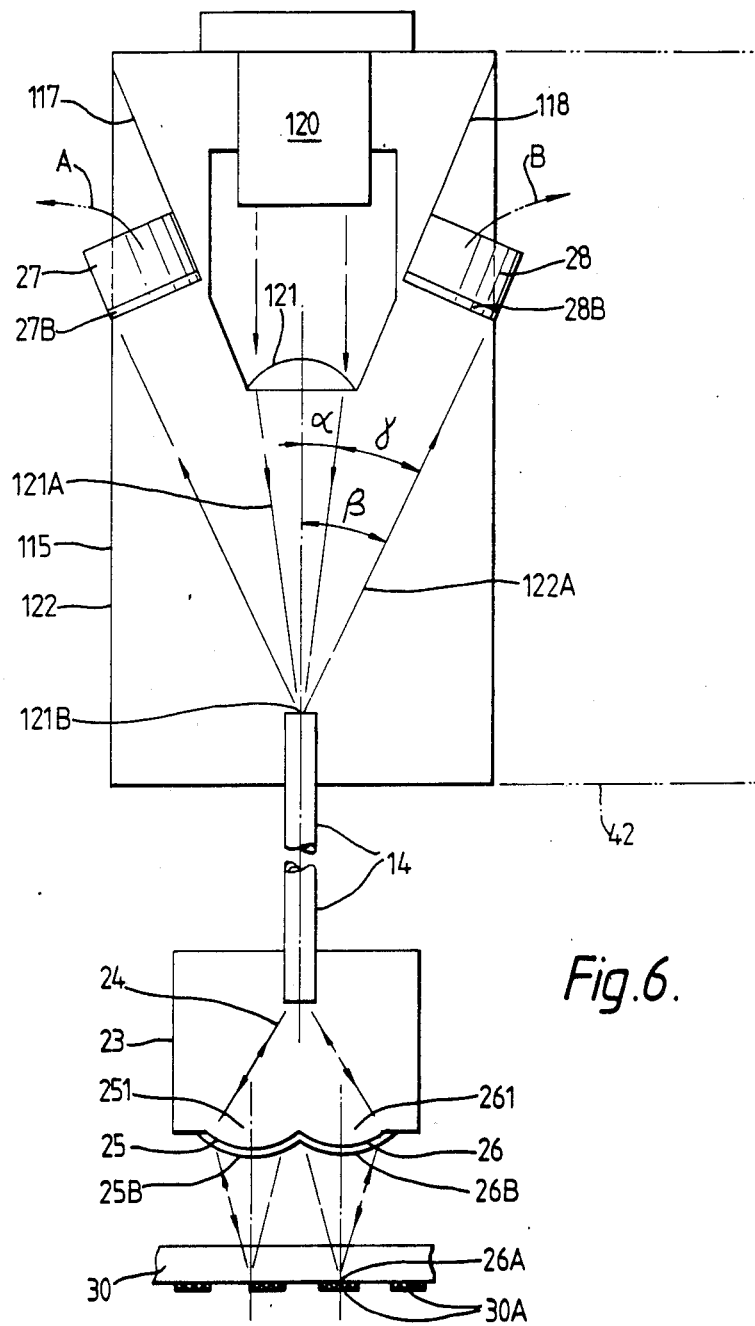
FIG. 6 shows a modification of FIG. 2.

FIG. 6 shows an input/output unit 115 generally corresponding to the unit 15 but comprising a member 122 of transparent material optically connected to the guide 14. The member 122 supports a light source 120 directing incident light on to a lens 121 producing a convergent cone 121A defined by an angle $\alpha$ and having a focus 121B at or near the end of the guide 14. Reflected light from the guide 14 has a divergent cone 122A coaxial with the cone 121A and defined by an angle $\beta$ equal to the maximum angle of internal reflection of the guide 14. The optical properties of the lens 121 are so chosen that the angle $\alpha$ of the cone 121A is smaller than the angle $\beta$ of the cone 122A by an angle $\gamma$ sufficiently large to allow a satisfactory volume of the reflected light to be received at locations outside the periphery of the lens 121 at recesses 117,118 adapted to receive the filters 27B,28B and diodes 27,28 described with reference to FIG. 2.

In a modification, not illustrated, the reading head 12 has two input stations each comprising an index grating and a lens system arranged to pass collimated light through the index grating on to the grid for reflection therefrom.

In a further modification, not illustrated, the reading head has a prism arranged to divide white light from the guide 14 into two frequency bands which are then focused onto the grid 13 by lenses such as the lenses 25,26 which, in turn, receive the reflected light for return transmission through the prism to the guide.

I claim:

1. An apparatus for measuring displacement between two members subject to movement relative to one another, the apparatus including: a scale defined by spaced marks provided on one of the members; a light source arranged to illuminate the marks, wherein light reflected from the marks constitutes light signals; light-receiving means provided on the other of the members for receiving at least two light signals reflected from the marks in predetermined phase relationship; determining means, coupled for receiving the light signals, for determining the sense of direction of the relative movement of one of the members based upon the phase relationship of the two light signals; and fiber-optic means for transmitting the light signals between the light-receiving means and the determining means; wherein the improvement comprises:

colour-encoding means located for colour-encoding the respective light signals; said light-receiving means includes means for combining the light signals into a combined light signal; said fiber-optic means consists of a sigle optical fiber for transmitting the combined light signal to said determining means; and colour-decoding means arranged between said single optical fiber and said determining means for colour-decoding the combined light signal.

2. Apparatus according to claim 1, wherein said light-receiving means includes first and second light receivers positioned relative to said marks so that during relative movement of said members said first and second light-receivers each receive a respective one of the two light signals from a respective one of said marks in the predetermined phase-shifted relationship.

3. Apparatus according to claim 2, wherein said light-receiving means is constituted by two lenses focused in one direction onto the spaced apart locations on said scale.

4. Apparatus according to claim 3, wherein said colour-encoding means comprises colour filters provided at said lenses.

5. Apparatus according to claim 3, wherein said single optical fiber has as end adjacent said lenses and said lenses are focused in a direction opposite to the one direction onto the adjacent end of said single optical fiber.

6. Apparatus according to claim 5, further comprising a transparent member, and wherein said adjacent end of said single optical fiber is connected to a portion of said transparent member, and said tranparent member is formed at another portion thereof to defined said lenses.

7. Apparatus according to claim 5, wherein said light source is connectd to an end of said single optical fiber remote from said lenses so as to illuminate said marks through said lenses, said lenses co-operating to focus incident light onto said spaced apart marks and to receive reflected light therefrom.

8. Apparatus according to claim 1, wherein said colour-encoding means are provided at said light-receiving means.

* * * * *